US008662410B2

(12) United States Patent
Murphy

(10) Patent No.: US 8,662,410 B2

(45) Date of Patent: Mar. 4, 2014

(54) MULTIPLE COLOR POWDER PAINT APPLICATION

(75) Inventor: Christopher M. Murphy, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2159 days.

(21) Appl. No.: 11/266,607

(22) Filed: Nov. 3, 2005

(65) Prior Publication Data

US 2007/0095852 A1 May 3, 2007

(51) Int. Cl.

| | |
|---|---|
| ***A62C 5/02*** | (2006.01) |
| ***B05B 9/00*** | (2006.01) |
| ***A01C 3/06*** | (2006.01) |
| ***B05D 1/34*** | (2006.01) |

(52) U.S. Cl.

USPC ............... 239/8; 239/143; 239/311; 239/654; 427/426

(58) Field of Classification Search

USPC .............. 239/106, 143, 311, 654, 8; 118/302, 118/324, 612, 698; 134/95.3, 99.1, 100.1, 134/102.1, 103.2, 169 R; 406/45, 123, 134, 406/135, 138, 181; 427/421.1, 424, 426

See application file for complete search history.

(56) References Cited

U.S. PATENT DOCUMENTS

| | | | | |
|---|---|---|---|---|
| 3,310,204 | A * | 3/1967 | Zinman et al. | 222/144.5 |
| 3,403,695 | A * | 10/1968 | Hopkins | 137/240 |
| 3,782,632 | A * | 1/1974 | Braun et al. | 239/112 |
| 3,912,235 | A * | 10/1975 | Janssen | 366/142 |
| 4,738,219 | A * | 4/1988 | Fujisawa | 118/666 |
| 4,881,563 | A | 11/1989 | Christian | 134/166 C |
| 4,928,880 | A * | 5/1990 | Prus et al. | 239/8 |
| 5,913,602 | A * | 6/1999 | Steele | 366/132 |
| 5,915,621 | A * | 6/1999 | Yanagida et al. | 239/3 |
| 5,916,625 | A * | 6/1999 | Rosenberger et al. | 427/8 |
| 5,968,268 | A * | 10/1999 | Kitano et al. | 118/52 |
| 6,238,746 | B1 * | 5/2001 | Fukuoka et al. | 427/424 |
| 6,296,706 | B1 | 10/2001 | Dattilo | 118/612 |
| 6,627,266 | B2 | 9/2003 | Dion | 427/421 |
| 6,830,414 | B2 | 12/2004 | Kia et al. | 406/138 |
| 6,942,161 | B2 * | 9/2005 | Shimada | 239/8 |
| 2004/0191005 | A1 * | 9/2004 | Kia et al. | 406/46 |

* cited by examiner

*Primary Examiner* — Ryan Reis

(57) ABSTRACT

The invention concerns a system and method for mixing various base colors of powder paint to create an application color of powder paint that is applied to an object, such as a vehicle body.

8 Claims, 5 Drawing Sheets

MULTIPLE COLOR POWDER PAINT APPLICATION

BACKGROUND OF INVENTION

The present invention relates generally to a powder paint delivery system and method, and in particular to a powder paint delivery system and method where many color combinations can be created just prior to application of the powder paint to an object, such as a vehicle body.

Powder paint, for various reasons, is in common use for painting large quantities of objects, such as vehicle bodies. For items such as vehicle bodies, where customers have a choice of multiple colors for their vehicles, a powder paint delivery system must be set up that allows for painting vehicle bodies in all of the available color choices. For example, a particular model of vehicle may come in a choice of ten different colors. The application of multiple colors of powder paint is currently accomplished by specifically manufacturing and supplying each individual color of powder paint, with the color of the paint particles for each overall color matching the particular individual color that will be applied to the vehicle. For each color, then, a separate distribution subsystem—including storage, pumps and hoses—is set up and maintained. So, for this example, ten different distribution sub-systems are needed. A color selector valve is then provided in the system between an applicator and the individual subsystems for each of the colors, with the color valve controlled to connect the subsystem for a particular color to the applicator for application on the vehicle body. These ten subsystems each take up a significant amount of space and require their own maintenance.

For some vehicle lines, the concern is even more significant since they may come in special order colors for fleet and other types of large quantity sales. In these plants, there may be as many as 20-25 different color choices for vehicles. The number of paint distribution subsystems, paint storage requirements, etc., becomes even more costly and difficult to maintain and manage.

Moreover, if a quantity of powder paint for a particular color is made, and that color is discontinued as a color choice for that vehicle, then the powder paint made in that color may be wasted. And the plant may have invested capitol in a paint distribution subsystem that is no longer needed. Again, the cost is more than desirable.

SUMMARY OF INVENTION

An embodiment of the present invention contemplates a powder paint delivery system for combining base colors of powder paint to form and deliver an application color powder paint having a visual appearance of a color different than the base colors of powder paint. The system may include a first bulk storage tank adapted to hold a first base color of powder paint having a first bulk storage outlet, a first metering pump operatively engaging the first bulk storage outlet, a second bulk storage tank adapted to hold a second base color of powder paint having a second bulk storage outlet, and a second metering pump operatively engaging the second bulk storage outlet. A mixing tank has a powder paint inlet operatively engaging the first metering pump and the second metering pump and is adapted to contain predetermined amounts of both the first base color of powder-paint and the second base color of powder paint in the mixing tank at the same time. A mixer operatively engages the mixing tank and is adapted to mix the first base color of powder paint and the second base color of powder paint to create a first application color powder paint. An applicator feed pump operatively engages the mixer, and an applicator has an inlet operatively engaging the applicator feed pump and is adapted to receive the first application color powder paint.

An embodiment according to the present invention may also contemplate a method of operating a powder paint delivery system comprising the steps of: transferring a predetermined amount of a first base color of powder paint from a first storage tank into a mixing tank; transferring a predetermined amount of a second base color of powder paint from a second storage tank into the mixing tank; fluidizing the first and second base colors of powder paint in the mixing tank; mixing together the first and second base colors of powder paint in the mixing tank to create a first application color powder paint that has a visual appearance of a color different than the first and second base colors of powder paint; and transferring the first application color powder paint to an applicator for application to an object.

An embodiment of the present invention may also contemplate a method of operating a powder paint delivery system comprising the steps of: transferring a predetermined amount of a first base color of powder paint from a first storage tank into a first mixing tank; transferring a predetermined amount of a second base color of powder paint from a second storage tank into the first mixing tank; fluidizing the first and second base colors of powder paint in the first mixing tank; mixing together the first and second base colors of powder paint in the first mixing tank to create a first application color powder paint that has a visual appearance of a color different than the first and second base colors of powder paint; transferring the first application color powder paint to an applicator for application to an object; transferring a predetermined amount of at least one of the first and second base colors of powder paint into a second mixing tank; transferring a predetermined amount of a third base color of powder paint from a third storage tank into the second mixing tank; fluidizing the at least one of the first and second base colors and the third base color of powder paint in the second mixing tank; mixing together the at least one of the first and second base colors and the third base color of powder paint in the second mixing tank to create a second application color powder paint that has a visual appearance of a color different than the first, second, and third base colors of powder paint; and transferring the second application color powder paint to the applicator for application to an object.

An advantage of an embodiment of the present invention is that a very large number of powder paint application colors can be provided from a relatively small number of base colors of powder paint. This allows for ease in supplying a greater number of color choices for customers, in supplying special order colors to customers, or even changing a color choice to be offered for a particular vehicle.

Another advantage of an embodiment of the present invention is that the number of colors of powder paint to order from suppliers is less since only the few base colors of powder paint are needed. This also allows for a generally smaller inventory of powder material on hand at each plant. Moreover, a smaller number of paint distribution subsystems—with less bulk storage containers, transfer hoses, metering pumps, color change valves, etc.—are needed. Thus, less floor space taken up, less capitol investment for equipment is needed, and less maintenance is required to maintain the system. This also may allow for standardization of powder paint delivery systems between various plants, which allows for bulk ordering of large quantities of the base colors for all plants, and provides a common paint system that is generally the same size for every plant—even if vehicles in the various plants offer different color choices for customers.

DETAILED DESCRIPTION

Figure 1:
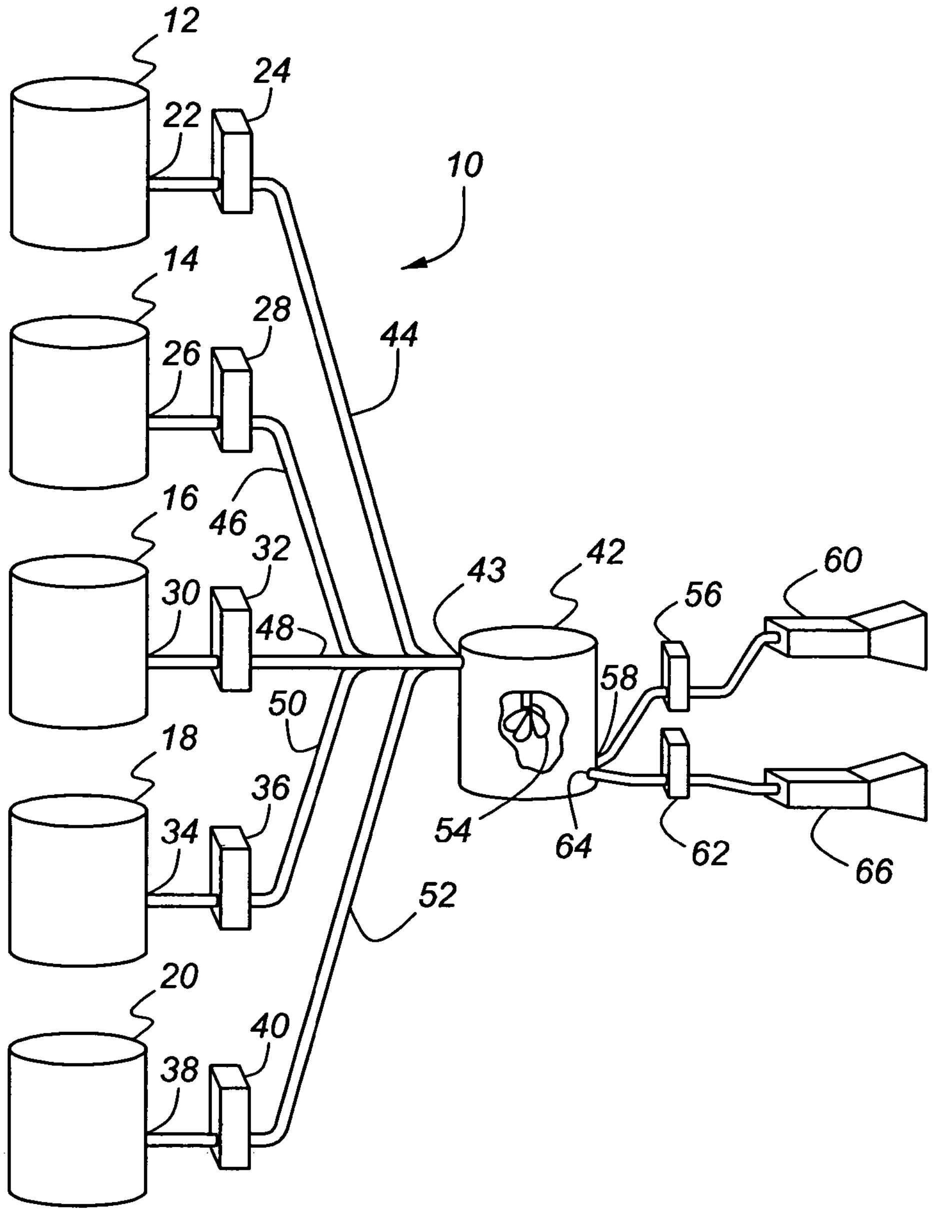
FIG. 1 is a schematic illustration of a portion of a powder paint delivery system, in accordance with a first embodiment of the present invention.

FIG. 1 illustrates a portion of a powder paint delivery system, indicated generally at 10. The powder paint delivery system 10 includes a first bulk storage tank/hopper 12, a second bulk storage tank/hopper 14, a third bulk storage tank/hopper 16, a fourth bulk storage tank/hopper 18, and a fifth bulk storage tank/hopper 20. Each bulk storage tank 12, 14, 16, 18, 20 holds and stores a different base color of powder paint until the paint is needed. For example, the first tank 12 may hold a yellow base color powder paint, the second tank 14 may hold a blue base color powder paint, the third tank 16 may hold a red base color powder paint, the fourth tank 18 may hold a white base color powder paint, and the fifth tank 20 may hold a black base color powder paint.

The first tank 12 has an outlet 22 connected to a line leading to a first metering pump 24. The second tank 14 has an outlet 26 connected to a line leading to a second metering pump 28. The third tank 16 has an outlet 30 connected to a line leading to a third metering pump 32. The fourth tank 18 has an outlet 34 connected to a line leading to a fourth metering pump 36. And the fifth tank 20 has an outlet 38 leading to a fifth metering pump 40. The metering pumps 24, 28, 32, 36, 40 may be any suitable type of transfer means for powder paint and can employ, for example, dense phase transport technology or vacuum transport technology, if so desired. Each tank 12, 14, 16, 18, 20 preferably has its own metering pump 24, 28, 32, 36, 40, respectively, so it can transfer precise amounts of its base color powder paint as needed by the system 10. Precise amounts of delivery of each base color powder paint is desired since the ratio of each base color mixed together will determine the visual appearance of an application color of powder paint.

The application color of powder paint is not an actual color of the particles of paint themselves, but rather the apparent color of the paint when seen by the human eye. That is, if one wished to paint a vehicle green, then blue base color powder paint and yellow base color powder paint would be mixed together and applied to the vehicle body. While the individual particles of paint would each still be their original colors (blue or yellow), the vehicle would appear to be green—the application color—since mixing of these two base colors would create a visual appearance of a green vehicle body. The combinations, then, are endless. For example, if one wished for an application color of light green, white base color powder paint can be added to the blue and yellow mixture. Another example is mixing red and white base colors of powder paint to obtain a pink application color.

The metering pumps 24, 28, 32, 36, 40 deliver the precise quantities of base colors of powder paint to a mixing tank 42 via lines 44, 46, 48, 50, 52, respectively. While the lines are shown entering the mixing tank 42 via a single inlet 43, alternatively, they can each feed into separate inlets to the mixing tank 42. The mixing tank 42 is sized to hold enough powder for the particular object or objects to which it is being applied. If a purge and fill process, discussed below, for the mixing tank 42 can be accomplished in the time allowed between painting vehicles, parts, or both, then only one mixing tank 42 may be required. Also, the mixing tank 42 can be sized to allow more than one applicator to be supplied by the single mixing tank 42. The mixing tank 42 can be sized to paint vehicles, parts, or both, in a batch method wherein one vehicle after another is painted the same application color.

The mixing tank 42 conditions and mixes the base colors of powder paint to produce the application color to be applied to the object. The mixing of the base colors of powder paint can be accomplished as part of a fluidization process, discussed below, or also by a mechanical mixer 54, if so desired. The mixing tank 42 conditions and mixes the base colors of powder paint until the paint is ready to be supplied to one or more applicators.

A first applicator feed pump 56 is connected to a first outlet 58 of the mixing tank 42 and operatively engages a first powder paint applicator 60 to supply powder paint thereto. A second applicator feed pump 62 is connected to a second outlet 64 of the mixing tank 42 and operatively engages a second powder paint applicator 66 to supply powder paint thereto. While the mixing tank 42 is shown supplying powder paint to two applicators 60, 66, only one applicator or more than two applicators may be supplied from a mixing tank, if so desired.

Figure 2A:
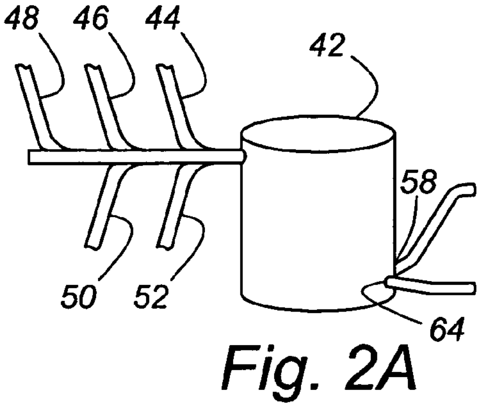
FIGS. 2A-2F schematically illustrate a filling and mixing process for a mixing tank employed with the powder paint delivery system of FIG. 1.
Figure 2B:
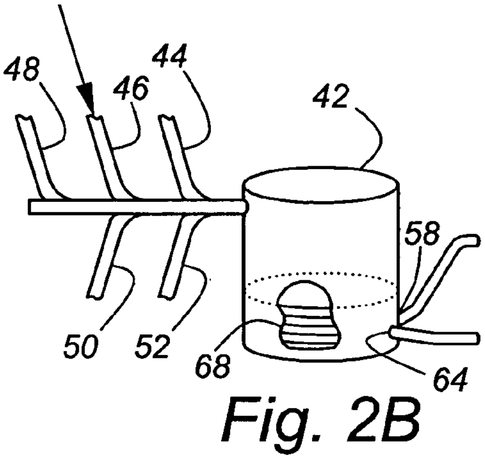
Figure 2C:
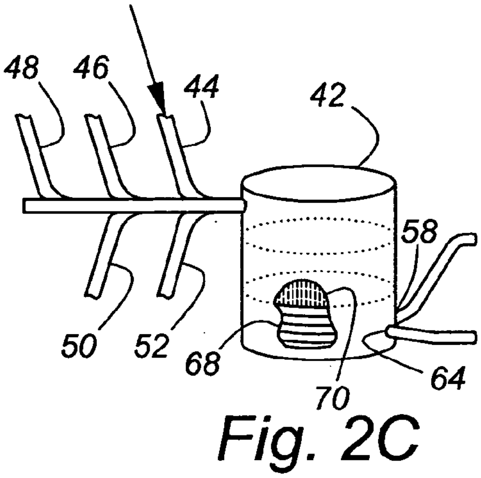
Figure 2D:
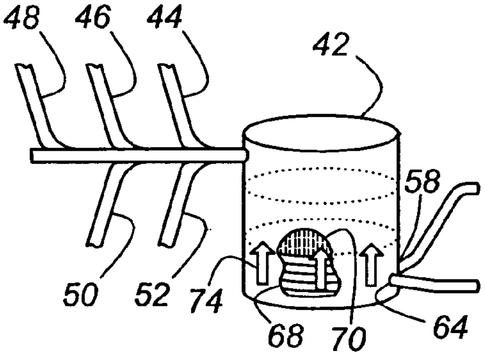
Figure 2E:
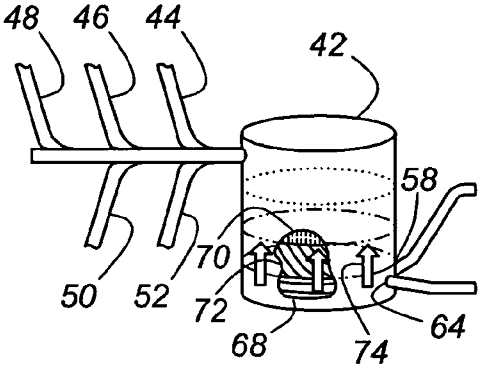
Figure 2F:
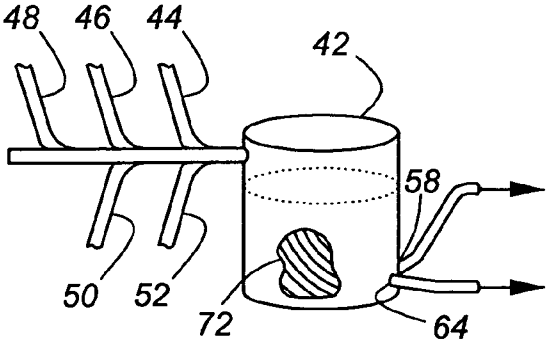

FIGS. 2A-2F, as applied to the system of FIG. 1, show an example of combining base colors of powder paint to produce a new color. In FIG. 2A, the mixing tank 42 is empty. In FIG. 2B, an accurately metered amount of a first base color of powder paint 68, such as for example blue (indicated by the solid horizontal cross hatch lines), is fed through the second line 46 into the mixing tank 42. In FIG. 2C, an accurately metered amount of a second base color powder paint 70, for example yellow (indicated by the vertical dashed lines), is fed through the first line 44 into the mixing tank 42. In FIG. 2D, the powder paint 68, 70 in the mixing tank 42 is subjected to fluidizing air flow 74. In FIG. 2E, the fluidizing air flow 74 is continued, which will cause mixing of the particles of the two base colors 68, 70. This mixing action may also include the use of the mechanical apparatus 54 (not shown in FIG. 2A-2F). As the particles of the two base colors 68, 70 intermix, the mixed paint particles begin to produce the application color 72, in this example, green (indicated by solid angled cross hatch lines). In FIG. 2F, after complete mixing, the powder paint now has a visual appearance of the application color 72, and is pumped from the mixing tank 42 to be sprayed onto an object, such as a vehicle.

As mentioned above, even though the individual particles retain their original blue or yellow color, the particles are small enough that they give a visual appearance of being the application color 72, which is different than either of the base colors 68, 70. That is, the particles are small enough that the human eye, when looking at a vehicle, cannot distinguish between the individual base colored particles, but instead sees a single application color that results from the combination of base colors.

Figure 3:
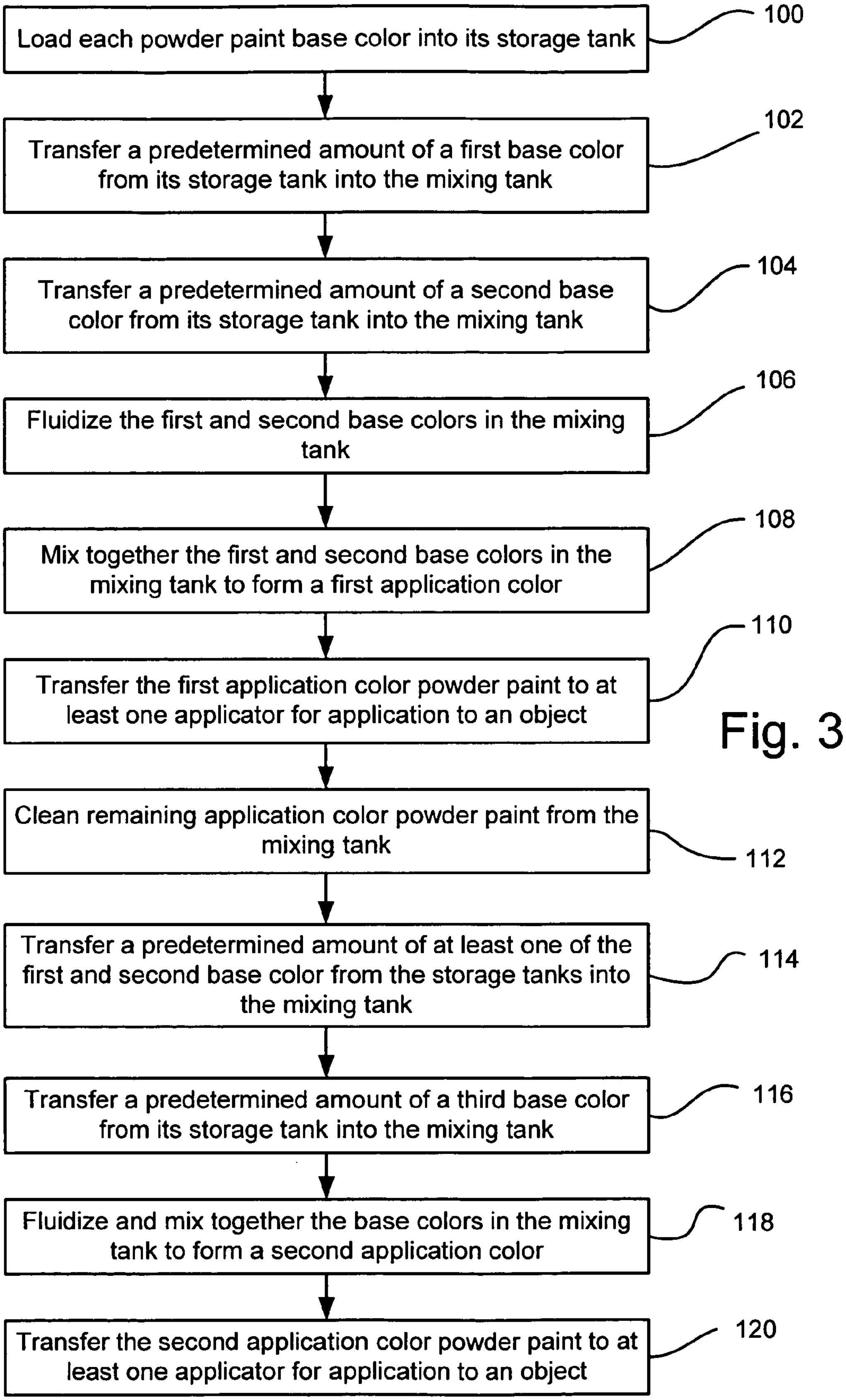
FIG. 3 is a flow chart illustrating a process of operating the powder paint delivery system of FIG. 1.

FIG. 3 shows a method of operating the powder paint delivery system of FIGS. 1 and 2. Each powder paint base color is loaded into its respective storage tank, block 100. A metering pump is activated to transfer a predetermined amount of a first base color from its storage tank into the mixing tank, block 102. Another metering pump is activated to transfer a predetermined amount of a second base color from its storage tank into the mixing tank, block 104. A fluidization process for the first and second base colors in the mixing tank is begun, block 106. The fluidization and mixing of the first and second base colors continues in the mixing tank, forming a first application color, block 108. The first application color powder paint is transferred to at least one applicator for application to an object, block 110. The remaining application color powder paint is cleaned from the mixing tank, block 112. At lest one metering pump is activated to transfer a predetermined amount of at least one of the first and second base color powder paints from its respective storage tank into the mixing tank, block 114. Another metering pump is activated to transfer a predetermined amount of a third base color from its storage tank into the mixing tank, block 116. A fluidization and mixing process is applied in the mixing tank to thoroughly mix the base color powder paints together to form a second application color, block 118. The second application color powder paint is transferred to at least one applicator for application to an object, block 120. The mixing tank can then be cleaned out and the process begun over again. Also, while this process only discusses mixing two base colors together to form an application color, any number of base colors, in various percentages, can be employed in order to produce the desired application color.

Figure 4:
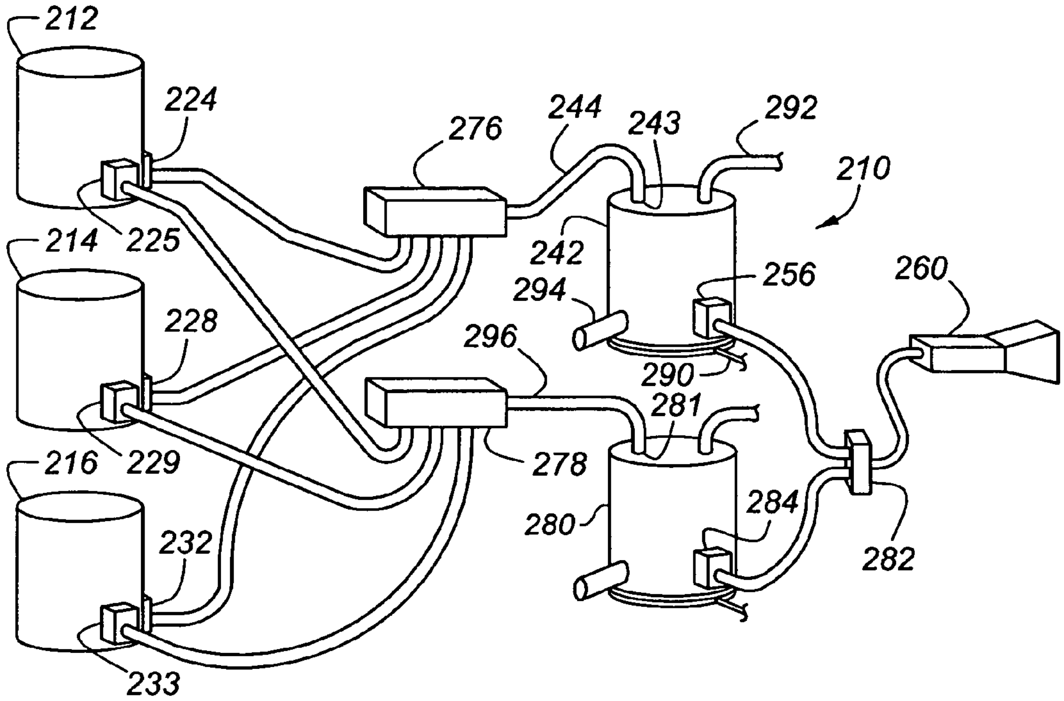
FIG. 4 is a schematic illustration of a portion of a powder paint delivery system, in accordance with a second embodiment of the present invention.
Figure 5:
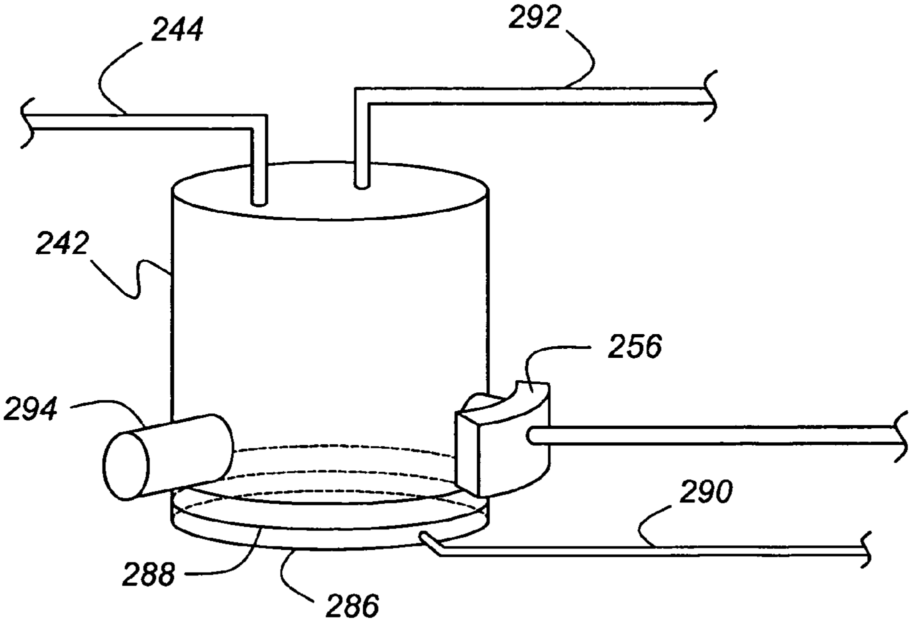
FIG. 5 is a schematic illustration of a mixing tank employed with the powder paint delivery system of FIG. 4.

FIGS. 4 and 5 illustrate a portion of a powder paint delivery system, indicated generally at 210, according to a second embodiment of the present invention. In this embodiment, elements similar to those in the first embodiment will be similarly designated, but with 200-series numbers.

The powder paint delivery system 210 includes a first bulk storage tank 212, a second bulk storage tank 214, and a third bulk storage tank 216. While only three bulk storage tanks for holding base colors of powder paint are shown in this embodiment, of course other numbers of bulk storage tanks corresponding to the number of base colors of powder paint being used in the system 210 can be employed. The first tank 212 operatively engages a first metering pump 224 and a second metering pump 225. The second tank 214 operatively engages a third metering pump 228 and a fourth metering pump 229. The third tank 216 operatively engages a fifth metering pump 232 and a sixth metering pump 233. Each storage tank 212, 214, 216 has two metering pumps, since one on each tank 212, 214, 216 operatively engages a respective one of a first color selector valve 276 and a second color selector valve 278.

The first color selector valve 276 is in communication with an inlet 243 to a first mixing tank 242 via a first line 244, while the second color selector valve 278 is in communication with an inlet 281 to a second mixing tank 280 via a second line 296. A first applicator feed pump 256 is connected to an outlet of the first mixing tank 242 and operatively engages a mixing tank selector valve 282. A second applicator feed pump 284 is connected to an outlet of the second mixing tank 280 and operatively engages the mixing tank selector valve 282. The mixing tank selector valve 282 selects from which mixing tank 242, 280 the powder paint comes when being fed to a powder paint applicator 260.

Each of the mixing tanks disclosed herein can be equipped with the following fluidization and purging features, best seen in the first mixing tank 242 shown in FIG. 5. A lower portion of the first mixing tank 242 has a fluidization air plenum 286 formed therein separated from an upper portion by a porous plate 288 horizontally disposed in the first mixing tank 242. A fluidization air inlet line 290 is connected to the fluidization air plenum 286 at an air inlet of the first mixing tank 242. Air can be introduced into the plenum 286 from the line 290, flowing upwardly through the porous plate 288 to cause the powder paint to be in suspension and to mix the particles of paint. A purge air inlet connects to a purge air line 292 and a dump valve/outlet 294 is provided at a lower portion of the first mixing tank 242. When purge air is provided to the first mixing tank 242 through the line 292, any of the powder paint remaining is pushed out through the dump valve/outlet 294, which is opened during purging operations.

This second embodiment provides additional flexibility in the paint delivery system 210 since, while one of the first and second mixing tanks 242, 280 is supplying application color powder paint to the applicator 260, the other of the first and second mixing tanks 242, 280 can be purged of unused application color powder paint left over from the previous object being painted and filled again with base colors of powder paint. Of course, if the purge and fill process for one of the mixing tanks 242, 280 can be accomplished in the time available between painting objects, then only one mixing tank may be required to switch between application colors, as is shown in the first embodiment. Furthermore, the mixing tanks 242, 280 can be sized to allow more than one applicator to be fed from a single mixing tank, such as is shown in the first embodiment. Also, a mechanical mixer, such as that shown in FIG. 1, can be employed with either or both of the mixing tanks of this second embodiment.

Figure 6:
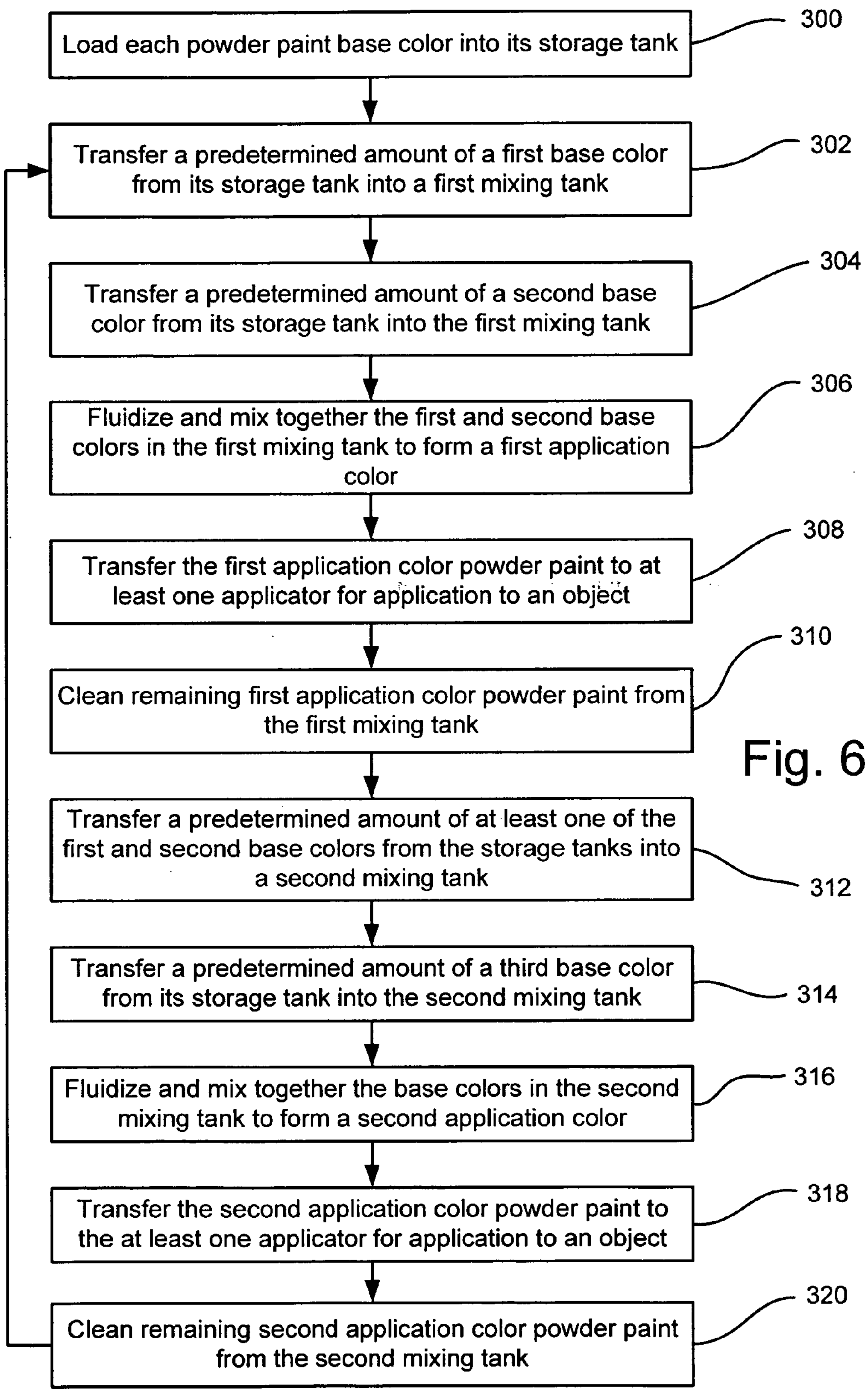
FIG. 6 is a flow chart illustrating a process of operating the powder paint delivery system of FIG. 4.

FIG. 6 shows a method of operating the powder paint delivery system of FIGS. 4 and 5. Each powder paint base color is loaded into its respective storage tank, block 300. A metering pump transfers a predetermined amount of a first base color from its storage tank into a first mixing tank, block 302. Another metering pump transfers a predetermined amount of a second base color from its storage tank into the first mixing tank, block 304. The first and second base colors of powder paint are fluidized and mixed together to form a first application color, block 306. The first application color powder paint is transferred to at least one applicator for application to an object, block 308. The remaining first application color powder paint is purged or otherwise cleaned from the first mixing tank, block 310. A metering pump transfers a predetermined amount of at least one of the first and second base colors of powder paint from their respective storage tanks into a second mixing tank, block 312. Another metering pump transfers a predetermined amount of a third base color of powder paint from its storage tank into the second mixing tank, block 314. The base colors of powder paint are fluidized and mixed together to form a second application color, block 316. The second application color powder paint is transferred to the at least one applicator for application to an object, block 318. The remaining second application color powder paint is purged or otherwise cleaned from the second mixing tank, block 320. The purging of the first or second mixing tank can, of course, be accomplished while the other mixing tank is being filled with base colors of powder paint, mixing the base colors to form an application color powder paint, and/or transferring the application color powder paint to the applicator.

While certain embodiments of the present invention have been described in detail, those familiar with the art to which this invention relates will recognize various alternative designs and embodiments for practicing the invention as defined by the following claims.

What is claimed is:

1. A method of operating a powder paint delivery system comprising the steps of:

providing a plurality of storage tanks for storing base colors of powdered paints;

loading each of the storage tanks with a different base color of powdered paint;

determining a first application color to paint an object, the first application color creatable by mixing powder paint from the base colors of powder paint loaded into the storage tanks, the first application color also having a visual appearance of a color different from any of the base colors of powder paint;

determining a proportion of each of the base colors of powder paint needed to create a powder paint having the first application color;

transferring the determined proportion of each of the base colors of powder paint from the plurality of storage tanks into a mixing tank in sufficient quantity to coat the object to be painted;

fluidizing the base colors of powder paint in the mixing tank;

mixing together the base colors of powder paint in the mixing tank to create the first application color powder paint; and transferring the first application color powder paint to an applicator for application to the object after the mixing together of the base colors of powder paint in the mixing tank in sufficient quantity to coat the object to be painted.

2. The method of claim 1 further comprising the steps of:

purging the first application color powder paint from the mixing tank;

determining a second application color to paint a second object, the second application color creatable by mixing powder paint from the base colors of powder paint loaded into the storage tanks, the second application color also having a visual appearance of a color different from any of the base colors of powder paint and the first application color;

calculating a proportion of each of the base colors of powder paint needed to create a powder paint having the second application color;

transferring the calculated proportion of each of the base colors of powder paint from the plurality of storage tanks into the mixing tank in sufficient quantity to coat the second object to be painted;

fluidizing the base colors of powder paint in the mixing tank;

mixing together the base colors of powder paint in the mixing tank to create the second application color powder paint; and transferring the second application color powder paint to the applicator for application to the second object after the mixing together of the base colors of powder paint in the mixing tank in sufficient quantity to coat the second object to be painted.

3. The method of claim 1 further including transferring the first application color powder paint to a second applicator for application to the object.

4. The method of claim 1 wherein the step of mixing includes employing a mechanical mixer.

5. The method of claim 1 wherein the step of mixing includes employing the fluidizing process for an extended period of time after the determined proportion of each of the base colors of powder paint has been transferred into the mixing tank in sufficient quantity to coat the object to be painted.

6. A method of operating a powder paint delivery system comprising the steps of:

transferring a predetermined amount of a first base color of powder paint from a first storage tank into a first mixing tank and a predetermined amount of a second base color of powder paint from a second storage tank into the first mixing tank in sufficient quantity to coat a first object to be painted;

fluidizing the first and second base colors of powder paint in the first mixing tank;

mixing together the first and second base colors of powder paint in the first mixing tank to create a first application color powder paint that has a visual appearance of a color different than the first and second base colors of powder paint;

transferring the first application color powder paint to an applicator for application to the first object after the mixing together of the first and second base colors of powder paint in the first mixing tank in sufficient quantity to coat the first object;

transferring a predetermined amount of at least one of the first and second base colors of powder paint into a second mixing tank and a predetermined amount of a third base color of powder paint from a third storage tank into the second mixing tank in sufficient quantity to coat a second object to be painted;

fluidizing the at least one of the first and second base colors and the third base color of powder paint in the second mixing tank;

mixing together the at least one of the first and second base colors and the third base color of powder paint in the second mixing tank to create a second application color powder paint that has a visual appearance of a color different than the first, second, and third base colors of powder paint; and transferring the second application color powder paint to the applicator for application to the second object after the mixing together of the at least one of the firs and second base colors and the third base color of powdered paint in the second mixing tank in sufficient quantity to coat the second object.

7. The method of claim 6 further including the step of purging the first application color powder paint from the first mixing tank while the step of transferring the second application powder to the applicator for application to an object is being accomplished.

8. The method of claim 6 wherein the step of mixing together the first and second base colors of powder paint includes employing the fluidizing process in the first mixing tank for an extended period of time after the first and second base colors of powder paint have been transferred into the first mixing tank in sufficient quantity to coat the first object.

* * * * *